(12) United States Patent
Zuevsky

(10) Patent No.: US 12,126,708 B1
(45) Date of Patent: Oct. 22, 2024

(54) PROVING INTERACTION LOCALITY WITH TIME-BASED CYPHERTEXT BY SECURE ELEMENT

(71) Applicant: Vitaly Zuevsky, London (GB)

(72) Inventor: Vitaly Zuevsky, London (GB)

( * ) Notice: Subject to any disclaimer, the term of this patent is extended or adjusted under 35 U.S.C. 154(b) by 0 days.

(21) Appl. No.: 18/131,521

(22) Filed: Apr. 6, 2023

(51) Int. Cl.
*H04L 9/06* (2006.01)
*H04L 9/08* (2006.01)

(52) U.S. Cl.
CPC .......... *H04L 9/0618* (2013.01); *H04L 9/0819* (2013.01)

(58) Field of Classification Search
CPC ....... H04L 9/3247; H04L 9/50; H04L 9/0869; H04L 9/008; H04L 9/0643; H04L 9/14; H04L 63/123; H04L 9/0825; H04L 9/3073; H04L 9/0618; G06F 21/602; G06F 2221/2107; G06F 21/64; G06F 2221/2113; G06F 21/72; G06F 21/31; G06F 2212/402; H04W 12/06; H04W 12/0433; H04W 12/037; H04W 12/03; H04W 12/50
USPC ......... 713/189, 150, 163, 181; 726/2, 21, 36
See application file for complete search history.

(56) References Cited

U.S. PATENT DOCUMENTS

| | | | | |
|---|---|---|---|---|
| 6,148,083 A * | 11/2000 | Fieres | .................... | G06F 21/602 380/255 |
| 8,971,533 B2 * | 3/2015 | Wall | ...................... | H04L 9/0897 713/172 |
| 11,488,434 B1 * | 11/2022 | Zuevsky | ............... | H04L 9/3239 |
| 11,924,328 B2 * | 3/2024 | Hammon | .............. | H04L 9/0662 |
| 11,983,494 B1 * | 5/2024 | Watkins | ................ | G06F 40/279 |
| 2009/0100264 A1 * | 4/2009 | Futa | ........................ | H04L 9/0844 713/170 |
| 2009/0247077 A1 * | 10/2009 | Sklovsky | ................ | G06F 9/445 455/41.1 |
| 2010/0162348 A1 * | 6/2010 | Narayanan | ........... | H04L 63/205 726/1 |
| 2010/0275028 A1 * | 10/2010 | Takashima | ........... | H04L 9/3247 714/E11.002 |
| 2011/0179473 A1 * | 7/2011 | Lee | ........................ | H04L 63/105 726/6 |
| 2012/0159149 A1 * | 6/2012 | Martin | ................ | H04W 12/069 713/151 |
| 2013/0294602 A1 * | 11/2013 | Huxham | ............. | H04L 63/0853 380/255 |
| 2013/0303085 A1 * | 11/2013 | Boucher | ............. | H04W 12/069 455/41.1 |
| 2013/0344807 A1 * | 12/2013 | Huomo | .............. | G06Q 20/3229 455/41.1 |
| 2017/0093879 A1 * | 3/2017 | Dayka | .................. | H04L 63/0471 |
| 2019/0138707 A1 * | 5/2019 | Hiltgen | ................... | G06F 21/34 |
| 2020/0004973 A1 * | 1/2020 | Li | ......................... | H04L 9/0643 |

(Continued)

OTHER PUBLICATIONS

V. Zuevsky, Electric Democracy: Proof of Work to secure Elections; https://arxiv.org/abs/2207.07446 (Jun. 30, 2022).

(Continued)

*Primary Examiner* — Sharif E Ullah
(74) *Attorney, Agent, or Firm* — K&L Gates LLP

(57) ABSTRACT

Systems and methods verify that a person's mobile device was presumptively in a vicinity of a secure element (SE) at a certain time. In a scenario where a collection of SEs is used, the systems and methods can verify that the person's mobile device was in a vicinity of at least one of the SEs in the collection.

27 Claims, 4 Drawing Sheets

(56) References Cited

U.S. PATENT DOCUMENTS

2022/0342972 A1* 10/2022 Van Os ................ G06V 40/172
2023/0161849 A1* 5/2023 Chih ........................ G06F 8/62
                                                        726/28

OTHER PUBLICATIONS

ICAO Master List and Document Signing Certificates: finding, extraction, and trust chain verification; https://github.com/psvz/icao.

Cloning detection for ePassports; https://www.inverid.com/blog/cloning-detection-epassports.

Advanced Security Mechanisms for Machine Readable Travel Documents and eIDAS Token, Technical Guideline TR-03110-1 Version 2.20 (Feb. 26, 2015); https://www.bsi.bund.de/SharedDocs/Downloads/EN/BSI/Publications/TechGuidelines/TR03110/BSI_TR-03110_Part-1_V2-2.pdf ?_ blob=publicationFile&v=1.

Security and Authentication, NXP Semiconductors; https://www.nxp.com/products/security-and-authentication.

SE050 Plug & Trust Secure Element Product Data Sheet, NXP Semiconductors, Revision 3.7 (Oct. 27, 2022).

Raspberry Pi 4 Computer Model B Product Brief, Raspberry Pi Trading Ltd. (Jan. 2021).

AN12570 EdgeLock SE05x Quick start guide with Raspberry Pi, NXP Semiconductors, Revision 1.5 (Aug. 3, 2022).

J. Schaad, Advanced Encryption Standard (AES) Key Wrap Algorithm, RSA Laboratories (Sep. 2002); https://www.rfc-editor.org/rfc/rfc3394.

S. Kelly, Using HMAC-SHA-256, HMAC-SHA-384, and HMAC-SHA-512 with IPsec, Aruba Networks (May 2007); https://www.rfc-editor.org/rfc/rfc4868.

M'Raihi et al., HOTP: An HMAC-Based One-Time Password Algorithm, VeriSign (Dec. 2005); https://www.rfc-editor.org/rfc/rfc4226.

M'Raihi et al., TOTP: Time-Based One-Time Password Algorithm, VeriSign (May 2011); https://www.rfc-editor.org/rfc/fc6238.

P. Pachuca, LoRa Edge™ Explained: How LR1110 Drives Smarter Geolocation, "Inside Out" Semtech's Corporate Blog (Jun. 3, 2020); https://blog.semtech.com/lora-edge-explained.

Waters et al., Secure, Private Proofs of Location, Secure Internet Programming Laboratory Department of Computer Science, Princeton University.

Talasila et al., Link: Location verification through Immediate Neighbors Knowledge, Computer Science Department, New Jersey Institute of Technology.

Luo et al., Proving Your Location Without Giving up Your Privacy, Cheriton School of Computer Science, pp. 7-12.

Saroiu et al., Enabling New Mobile Applications with Location Proofs, Microsoft Research.

Gambs et al., Props: A privacy-preserving location proof system, Proceedings of the IEEE Symposium on Reliable Distributed Systems (Oct. 2014).

* cited by examiner

PROVING INTERACTION LOCALITY WITH TIME-BASED CYPHERTEXT BY SECURE ELEMENT

BACKGROUND

Certain cryptographic algorithms take an input, operate on it with a secret, and produce a verifiable output based on the input and the secret. Some System-on-chip (SoC) hardware components can keep a secret for internal use by the SoC, and the secret cannot be recovered outside the SoC by design. Examples of such SoCs are secure elements ("SEs"), trusted platform modules ("TPMs"), cryptographic co-processors, all of which can include, for purposes of this application, some processing capability, volatile and non-volatile types of memory, and embedded firmware. "Verifiable" means that it can be rigorously established that one particular output was produced by a certain secret coupled with a certain input. Additionally, knowing the input and the output does not allow the secret to be derived, even though the secret is used to derive the output from the input.

SEs are commonly used in Internet of Things (IoT) environments where each IoT device has an SE for identifying securely the corresponding IoT device. In one example, SEs of the IoT devices electronically sign data reported back to a command center. The command center verifies the IoT device from which each report is transmitted and verifies that no adversary could have faked or modified the report. If any bit of that report is changed-maliciously or by communication error-signature verification at the command center will fail.

Other notable use cases where SoCs, such as an SE, are employed encompass clone protection, verification of firmware integrity, and digital rights management (DRM). The chips are normally tamper-resistant and prevent the cloning of the internal secrets for external use.

Additionally, time-based One-Time Password (TOTP) algorithms (see RFC 6238 for example) are widely used to generate a second factor in user authentication.

SUMMARY

In one general aspect, the present invention is directed to systems and methods for verifying that a person, or at least that person's mobile device, was at a certain location at a certain time. In particularly, the systems and methods of the present invention can verify that the person was presumptively in a vicinity of an SE at a certain time. In a scenario where a collection of SEs is used, the systems and methods can verify that the person was in a vicinity of at least one of the SEs in the collection at a certain time.

In another general aspect, a system according to embodiments of the present invention comprises: a local host, where the local host comprises a secure element ("SE"); a verifier; and a user device. The SE is configured to produce a cyphertext based on a secret stored by the SE and based on an input to the SE that is based on a current time. The user device is configured to receive, by a short-range data transfer means, from the local host, verification data, where the verification data are based on the cyphertext. The user device is configured to transmit, to the verifier, the verification data. And the verifier is configured to verify that the verification data have been produced by the secret, so that the user device is likely within the data transfer range of the local host at the current time.

The cyphertexts can be created using symmetric or asymmetric cryptography. With symmetric cryptography, the verifier may perform the same operations as the local host or SE for that matter, using the same secret. To account for latencies in transmitting the verification data from the local host to the user device, and from the user device to the verifier, the verifier may compute a few verification codes using the secret and a clock signal of the verifier. The verifier can compare those few verification codes that it computes to the verification data from the user device. If one of them matches, the verification can be considered successful. The user device was presumptively in the vicinity of the SE at the time used by the local host to instruct the SE to generate the cyphertext, which was used to generate the verification data transmitted to the user device.

The proximity of the user to the SE can be resolved at the range of the short-range data transfer means for transmitting the verification data from the local host (with the SE) to the user device. The verification data can be sent via limited-range, wireless, electromagnetic signals, such as, for example, a Bluetooth link or a Near Field Communication (NFC) link. The transmission could also be visual. For example, the local host could generate a QR code that encodes the verification data. The user device could read the QR code with the camera of the user device. Also, the verification data could be a user-readable code (e.g., a numeric or alphanumeric sequence) that the user could see and type into his/her user device for transmission to the verifier. Other short range data transfer means could also be used, such as encoded acoustic signals that the user device could pick up and decode to recover the verification data for transmission to the verifier.

A method according to the present invention comprises, according to various embodiments, the step of producing, by a first SE, a cyphertext, where the first SE is a component of a first local host. The cyphertext is produced by: supplying an input to the first SE, where the input is based on a current time; and producing the cyphertext based on a secret stored by the first SE and based on the input. The method also comprises transferring, by a short-range data transfer means, verification data from the local host to a user device, where the verification data are based on the cyphertext. The method also comprises receiving, by a verifier, from the user device, the verification data. The method also comprises verifying, by the verifier, that the verification data have been produced by the secret, so that the user device is presumptively within a range of the short-range data transfer means of the local host at the current time.

The co-location technique can be extended, in various embodiments, to a network, or collection, of local hosts, each with an SE. In such an aspect, the method comprises producing, by a first secure element ("SE"), a cyphertext, where the first SE is a component of a first local host, where the first local host is one of a plurality of local hosts positioned across an area (geographic or habitable otherwise e.g., a large building), and where each of the plurality of local hosts comprises an SE. Producing the cyphertext comprises: supplying an input to the first SE, wherein the input is based on a current time; and producing the cyphertext based on the input and based on a common secret stored by the SE of each of the plurality of local hosts. The method also comprises transferring, by a short-range data transfer means, verification data from the first local host to a user device, where the verification data are based on the cyphertext. The method also comprises receiving, by a verifier, from the user device, the verification data. The method also comprises verifying, by the verifier, that the verification data have been produced by the common secret, so that the user device is presumptively within a data transfer range of one of the plurality of local hosts at the current time.

The corresponding system can comprise: a plurality of local hosts, where each local host comprises a secure element ("SE"), such that the plurality of local hosts comprises a first local host that comprises a first SE; a verifier; and a user device. The first SE is configured to produce a cyphertext based on a common secret stored by each of SEs and based on an input to the first SE that is based on a current time. The user device is configured to receive, by a short-range data transfer means, from the first local host, verification data, where the verification data are based on the cyphertext. The user device is configured to transmit, to the verifier, the verification data. And the verifier is configured to verify that the verification data have been produced by the common secret, so that the user device is presumptively within a data transfer range of one of the plurality of local hosts at the current time.

Embodiments of the present invention can have many practical and valuable applications. For example, the systems and methods could be used to verify that the user was at a certain place and a certain time. This could be valuable for government or civic purposes, such as verifying that a person was at a voting location at a time that the person's vote was cast, or that a person went through certain stages of a security checkpoint. Embodiments of the present invention could also be used to track the location of employees, over time, in a large building, warehouse or other facility. These and other advantages and benefits are realizable through embodiments of the present invention will be apparent from the description to follow.

BRIEF DESCRIPTION OF THE FIGURES

Various embodiments of the present invention are described herein by way of exampling in connection with the following figures.

DESCRIPTION

Figure 1:
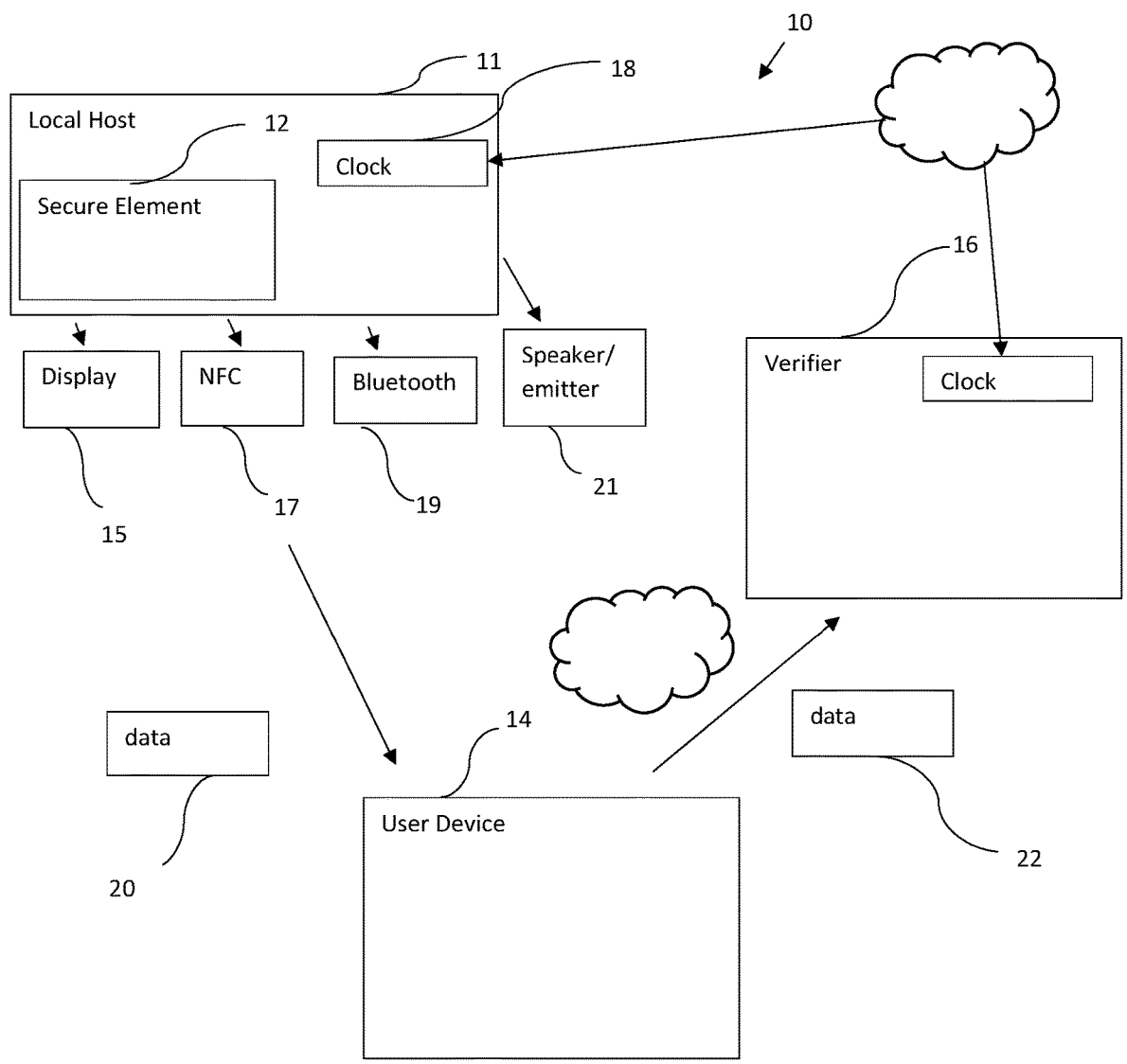
FIG. 1 is a diagram of a system for proving interaction locality with time-based cyphertext, according to various embodiments of the present disclosure.

According to embodiments, the present disclosure is directed to proving collocation between a user and a secure element (or a "local device" or "local host" that includes the secure element). The secure element ("SE") is at a known location. The collocation verifies location of the user at present time because the position of the SE is known and the range of interaction, e.g., a range of a short-range data transfer means, between the SE and the user is limited. For example, in voting a user shows up to a designated location. The present disclosure verifies that the user is at the designated location at a current time. This ensures collocation of a voter with a known location and time. With reference to FIG. 1, the system 10 comprises a local device 11 (also known as a local host), a user device 14, and a verifier 16. The local device comprises a clock 18, a secure element (SE) 12, and means for transmitting verification data generated by the local host 11 based on the cyphertext output of SE 12 to the user device 14. An example of means for transmitting verification data are a display 15, NFC 17, Bluetooth 19, and speaker 21. In one embodiment, the means for transmitting verification data are coupled to the local device 11. In another embodiment, the means for transmitting verification data are integrated into the local device 11. The user device 14 can be communicatively connected to the local host 11 via a wireless data link, such as a Bluetooth or NFC data link. The user device is also communicatively connected to the verifier 16 via an electronic data network, such as the Internet, a LAN, a WAN, having wired and/or wireless data links.

Figure 4:
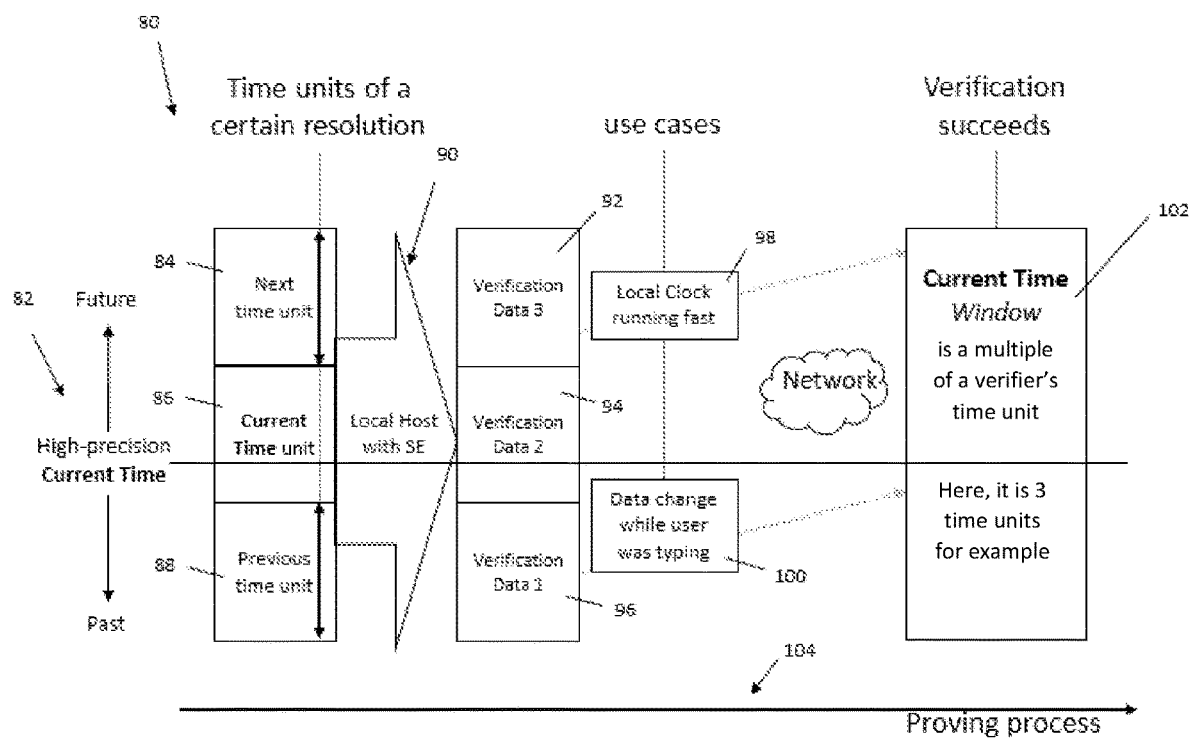
FIG. 4 is a block diagram of an arbitrary time resolution and interpretations of current time according to various embodiments of the present disclosure.

The clock 18, which can be embodied as an integrated circuit or a software feature, supplies a clock signal. Software run by a processor of the local host can modify the resolution of the clock signal. For example, if a 30-second resolution is desired, the software can read seconds (generally a clock-dependent resolution) and divide it by 30 (desired resolution in units of the clock). The result is what could be an input to the SE. This resulting time ticks (changes) every 30 seconds. That result may also be combined with other data and supplied to the SE by the software, as described herein. The clock signal, with its modified resolution, has a pre-determined resolution, which can be a number of seconds, milliseconds, minutes, or any convenient value, such as 30-second as mentioned above. In one embodiment, a clock supplies Unix time—the seconds counted from 00:00:00 1 Jan. 1970. The current time is inherently characterized by resolution, wherein its measure persists for the entirety of the resolution unit. For example, if the resolution is one minute, the present time will stay constant for the duration of the minute and advance when the minute has elapsed. FIG. 4 is an example of three distinct resolution units (also known as time units).

In some embodiments, when activated, the local host 11 derives the clock signal from the clock 18. Activation can occur when a user inputs from the user device 14 or the user inputs on the local host 11. For example, a software application on the user device 14 may communicate with the local host 11 to activate the local host 11 to generate the verification data. That is, the user device 14 can send a signal to the local host 11 to get verification data. As another example, NFC tag could detect field of a user device and, consequently, wake up the local host 11. Yet in other example, the local host 11 could comprise a user interface where the user of the user device 14 makes a selection (e.g., presses a real or virtual button) to initiate the verification process. When activated, an input data based on the current time is sent to the secure element 12 by the local host 11. In one embodiment, the clock 18 is integral with the SE 12. In another embodiment, the clock 18 is a separate circuit connected to the SE 12. Yet in another embodiment, the clock 18 is any regular computer clock comprised by the local host 11. The local device 11 can be positioned at a location that is known (e.g., stored by the verifier 16). The location of the local device may be fixed, temporary or semi-permanent. In other embodiments, the local host does not need to be activated to produce the verification data. For example, it can update a display of the verification data consistent with the time resolution unit in operation (FIG. 4). For example, if the local host uses 30-second resolution, the display of the local host could be updated every 30 seconds with the new verification data (derived from the new SE input). The user and/or user device could read/scan the displayed verification data without having to activate the local host.

FIG. 1, for simplicity, shows only one local host 11. There may be many local hosts 11 at locations known to the verifier 16. The SE of each such local device 11 is tamper-resistant. The hardware and embedded software of the SEs can meet the requirements of the Security IC Platform Protection Profile (PP 0084) including resistance to physical tampering scenarios described within it. Examples of suitable SEs include the NXP SE050, the Microchip ATECC608 and the STSAFE-A110. The SEs 12 may also be implemented with trusted platform modules (TPMs). Each SE 12 may comprise a microprocessor configured to store a secret for internal use, e.g., generating the cyphertext based on input data and the secret, and safeguard against extraction of the secret for external use. The verifier 16 knows the secrets of the SEs 12 or corresponding public keys. The SEs may have a common secret or different secrets. For example, a set of one or more local hosts 11 can comprise two or more local hosts 11 that comprise at least the first local host and a second local host. The secret for the SE of the second local host is different from the secret of the first SE. The verifier 16 may store the secret of the SE of the second local host and the secret of the first SE. The secret is for internal use and the SEs prevent extraction of the secrets. The secret can be a key or value stored within the SE 12. For example, a secret is a sequence of bytes that cannot be guessed or found by computation during the lifespan of the system. The length of the sequence depends on an algorithm the secret is used with and is usually not less than 32 bytes. Additionally, the secret may be shared, wherein an SE and the verifier use one same secret, or asymmetric, wherein an SE uses a secret key and the verifier uses a corresponding public key.

The SE 12 is configured to generate a cyphertext based on the secret. In various embodiments, the SE 12 is configured to generate the cyphertext based on the secret and the input. The input is based on the reading of the clock 18 by the local host. The cyphertext may be a hash-based message authentication code (HMAC) or a product of any other symmetric-key cryptography. In another embodiment, the cyphertext is a digital signature or a product of asymmetric-key cryptography. In another embodiment, the input is additionally based on geo-location of the local device, and/or an arbitrary identifier for the local host. This identifier may identify a secret or a public key the verifier must use in verification process. The identifier and secret combinations are used to differentiate local hosts and their locations (if relevant). The cyphertext is a sequence of bytes; the length of the sequence depends on the algorithm used and normally exceeds 30 bytes. The local host 11 generates verification data based on the cyphertext to send to the user device 14. For example, the verification data may be the cyphertext itself displayed as a QR code to be scanned by a user with a camera in their user device. QR codes can contain hundreds of bytes. In other embodiments, the verification data can encompass the cyphertext and the arbitrary identifier used to produce the cyphertext. Yet in other embodiments, the verification data may be several alphanumerical characters displayed on a screen to which a local device is connected. The characters are entered by a user to their user device manually.

There are infinite ways to deterministically compress cyphertext (a sequence of bytes). Adding bytes together, for example, would result in a byte integer from 0 to 255. In practice, verification data for manual transfer by a user must be concise enough for convenience but complex enough to prevent guessing while verification window lasts (as shown in FIG. 4). If the time resolution unit is 30 seconds, for example, the cyphertext and the verification data change every 30 seconds. Furthermore, the verifier can check a number of such consecutive time units; thus widening the time window where the verification data are valid. One practical way to derive a short code from a cyphertext could be interpreting first three bytes as a decimal number (the range 0-16,777,216). Another possibility could be interpreting cyphertext as a hexadecimal sequence and take last 6 characters. The advantage of the latter is fixed number of characters in the code. Asymmetric cryptography, on the other hand, does not allow lossy compression of cyphertext because a cyphertext represents a digital signature required, along with data it signs, for verification calculations.

The local host 11 is configured to transfer the verification data to the user device 14 by a short-range data transfer means over a data transfer range. The data transfer range may be constrained by technology or by human abilities and behavior (e.g., ability to sight a display or hear an acoustic broadcast). The short-range data transfer means may comprise, for example, an electromagnetic communication link between the local host and the user device, a Bluetooth 19 communication link between the first local host and the user device, a Near Field Communication 17 (NFC) communication link between the first local host and the user device, display of a Quick Response (QR) Code by the first local host that is read by the user device, an acoustic broadcast of the verification data by an emitter 21 of the first local host that is perceived by a user of the user device and/or by the user device directly (e.g., via modulated sound waves decoded by the user device), and a visual display of the verification data by the first local host that is seen directly by the user of the user device and/or by a computer vision system of the user device with the capability to read (e.g., OCR) the verification data. For example, the local host can be configured to generate a QR code for the verification data that the user device 14 is configured to read to receive the verification data from the local host 11. In another example, the user device 14 can require a manual transfer of the verification data by a user. For example, the user of the user device 14 can visually see the verification data on a display connected to the local host and could enter the verification data in the appropriate software interface on the user device. In yet another example, the verification data is sent by the local host over radio waves and is received by the user device 14 using, for example, Bluetooth or NFC or Wi-Fi. For example, the local host may be connected to a Bluetooth radio circuit and/or NFC circuitry for publishing the verification data to the user device. In another example, the verification data can be sent through an acoustic broadcast such as over sound waves by an emitter 21 connected to the local host, sending to the user or the user device 14. The user could hear the audible verification data and enter it into the appropriate application on the user device. Also, the user device 14 could comprise automatic speech recognition software for recognizing the audible verification code emitted by the local device. The verification data may also be sent using tones, where each number in the verification data has a different tone (e.g., frequency) that user device can decode.

In one embodiment, the local host 11 comprises a computer system that is configured, through software, to construct the input, to interface with SE, to construct the verification data, and to transfer the verification data.

The user device 14 is configured to send the verification data to the verifier 16. The verifier 16 and the user device 14 are communicatively connected via an electronic data network, which could be the Internet, a LAN, and/or a WAN, for example, and could include wired and/or wireless communication links (e.g., Wi-Fi or cellular networks). The verification data is transmitted over a data network between the user device 14 and the verifier 16.

In one embodiment, the verifier 16 is a computer system that comprises one or more internetworked computers. The each computer of the verifier 16 comprises at least a memory and a processor. The memory stores instructions executable by the processor to verify the verification data. For example, the verifier comprises a computer system that is in communication with the user device via an electronic data network. A software application of the user device, when executed by the user device, is further for transmitting the verification data to the verifier via the electronic data network. In another example, the software of the local host or user device further causes, when executed, to indicate a remaining time before the verification data is changed.

The verifier 16 may store secrets and is configured to verify whether the verification data have been produced by the secret of any of the local hosts. For example, the verifier does not store the secret when the verification data comprises a public key for the secret. Another example, the verifier 16 can store numerous secrets and store which secret belongs to which identifier. In one embodiment, the secret comprises a secret key and the verifier 16 stores the corresponding public key for the secret key. By verifying that the verification data have been produced by the secret the verifier can reasonably assume that the user is likely near the SE 12 of a local host 11. The verifier 16 also assumes the location of the local host 11 and, thus, can record the assumed spatiotemporal position of the user. The verifier is able to assume the location of the user by differentiating which SE produced the verification data. The verifier 16 has a clock. In one embodiment, the clock of the verifier 16 and the clocks of local hosts 11 are at least intermittently synchronized by the global Network Time Protocol (NTP) or by any other suitable facility of the computing cloud.

In one embodiment, the verifier 16 verifies the verification data by computing a plurality of cyphertexts, wherein each of the cyphertexts is based on a clock signal of the verifier 16. Referring to FIG. 4, the cyphertexts are computed for a past 88, a present 86, and a future 84 consecutive time units; the verifier chooses a current time window 102 consisting of the corresponding units by the clock of the verifier—that is to accommodate delays in transfer of the verification data and lapses in clock synchronization. The verifier 16 also generates a code from each of the plurality of cyphertexts (e.g., by deterministic compression as described above), and compares the codes to one within the verification data from the user device.

Cryptographic algorithms permit the verifier 16 to rigorously verify that some verification data was generated with a secret. The short-range data transfer ensures the verification data are transmitted by a user in proximity of a generation site that produces the verification data (such as the local host). Thus, the user hypothetically can: 1) transmit the verification data to other users who re-send the data to the verifier or 2) be moving such that verification data are picked up at the start of current time unit (e.g., 60 seconds while a local device is displaying one same code), and by the end of the time unit the user reaches another local device (locality). Both are examples where the assumption about user location based on successful verification would not hold. Another example of such breach would be an adversary moving a local device to some new location, where knowledge of the verifier about the location becomes incorrect. To tackle those uncertainties, cooperative agents (e.g., monitors) within environments of the local hosts can be deployed to make sure users are not leaving the location of the local host immediately after obtaining the verification data from the local host. Secondly, a map of local devices linking every device to a publicly identifiable location may be employed, with the map being the knowledge of the verifier and being public, so that the agents could flag deviations.

In one embodiment, for a voting application, the risk of a voter broadcasting verification data to remote voters being coerced can be mitigated by closed-circuit television (CCTV) registering activity inside polling stations. As long as an incoming voter attends a voting booth an attempt of coercion would fail because the voter has their last say in the booth, where the verification data is picked up. Since every voter has to attend a polling station to register to vote, the fact that they attend both—the registration and the booth—can be ascertained from CCTV.

On the other hand, if a user transmits verification data for use by others remotely and also verifies themselves, it is likely that they scan/enter the verification data twice. This behavioral pattern can be recognized by CCTV or reported by cooperative agents around, which makes the breach of locality assumption by the verifier more of an exception rather than the rule. Besides, a finer time resolution, such as 15 seconds in place of 30 for example, wherein verification data changes more frequently, would make it logistically more difficult for a user to transfer data twice as each transfer takes some time. Finally, the mere fact of observation (as we know from CCTV practice) tackles unconventional behavior, such as going through the motions of re-distributing verification data by a user where they were made aware that they shouldn't.

Another use case for the system could be a checkpoints grid for employees whose duties are scattered across a large area, such as a rail-network, an enormous manufacturing site, or a hospital. Software on the employees' phones could receive verification data from local devices positioned on the grid with or without manual intervention from the user. The phones could further transmit the verification data together with respective employee IDs to a central registrar (verifier), building a dataset for managerial analysis and optimization of the workflow for example.

Figure 2:
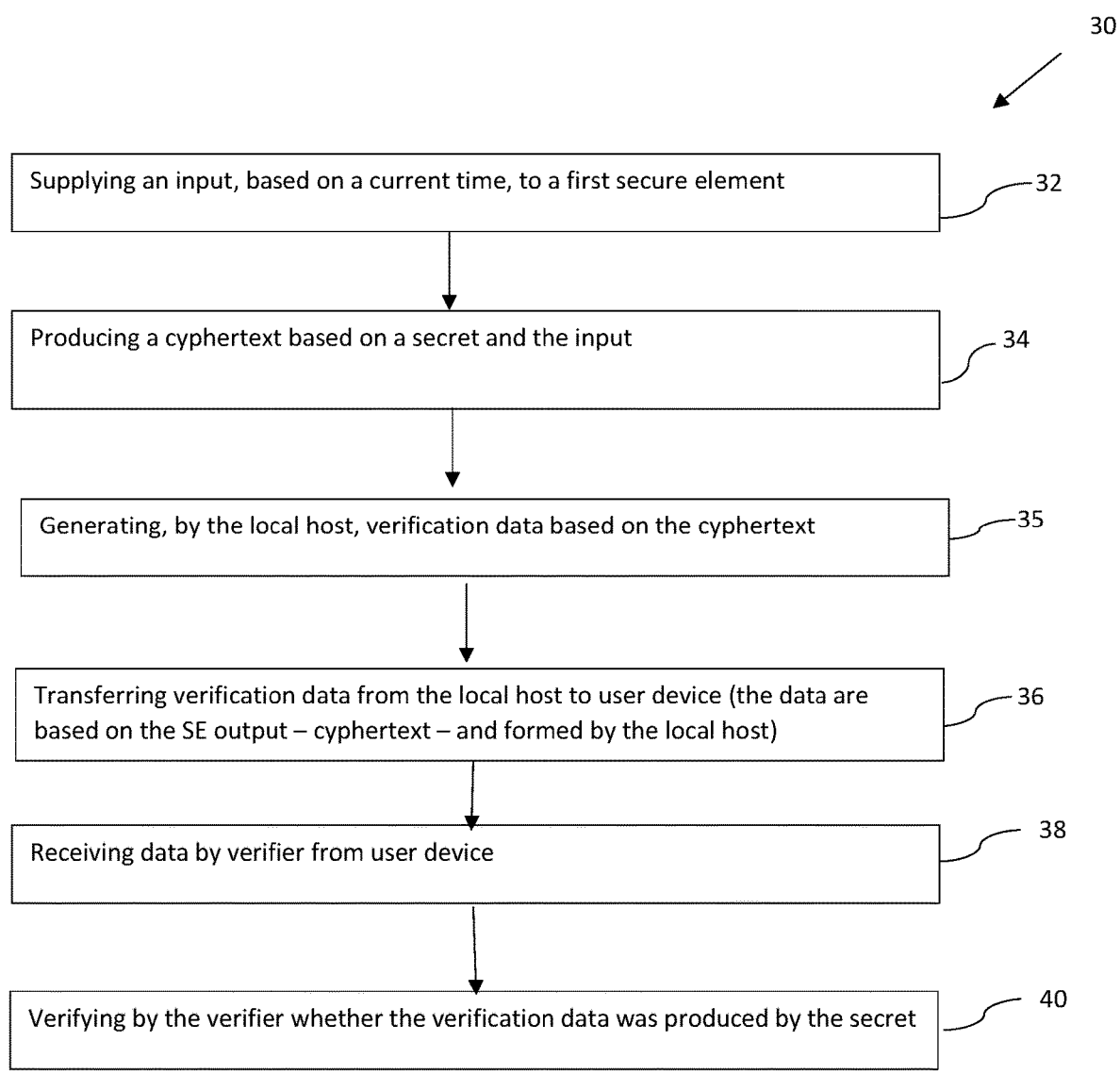
FIG. 2 is a flow diagram for proving interaction locality with time-based cyphertext, according to various embodiments of the present disclosure.

FIG. 2 is a flow diagram of a method 30 for proving interaction locality with time-based cyphertext, according to various embodiments of the present disclosure. The method 30 comprises a first step 32 of preparing, and supplying to a first secure element, an input for the first SE. The input is based on the current time read from the clock. The input can also comprise other information such as a geo-location of the local host and/or various identifiers (of SE, local host, interacting user (user device), their attributes etc). The first secure element can be part of a local host. In one embodiment, there are one or more local devices comprising one or more SEs. The SE stores a secret.

The second step 34 comprises, producing a cyphertext based on the secret and the input. Producing, by an SE, a cyphertext, comprises: supplying, at a current time, an input to the first SE, wherein the input is based on the current time and producing, the cyphertext based on a secret stored by the first SE and based on the input. In one embodiment, the input is additionally based on a geo-location of the first local host and/or an identifier for a first SE.

At step 35, the SE local host generates the verification data (or code) from the cyphertext. The verification data can comprise, for example, a shortened, or compressed, version of the cyphertext. It can also indicate or include other information, such as a public key to decrypt the verification data, a time stamp for the "current time" that was used to generate the cyphertext, and/or a signature for the local host. The format for the verification data generated by the local host can conform to the manner in which it is transferred to the user device 14. For example, if a QR code is used to transfer the verification data, step 35 can involve generating the QR code that encodes the verification data. If a wireless, digital data transmission is used (such as Bluetooth or NFC, for example), step 35 can involve generating data packets according to the applicable wireless data transfer protocol, wherein the data packets include the verification data. As another example, if the data transfer means comprise audio codes, at step 35 the local host 11 can generate the audio codes that encode the verification data.

Next, step 36 comprises transferring data from the local host to the user device. Transferring verification data from the local host to a user device by a short-range data transfer means. The verification data are based on the cyphertext, as described above. The short-range data transfer means can be, for example, an electromagnetic communication link (including infrared and visible modes of transfer) between the local host and the user device, such as a Bluetooth communication link between the first local device and the user device, or a Near Field Communication (NFC) communication link between the first local device and the user device. Also, the short-range data transfer means could be a display of a Quick Response (QR) Code by the first local host that is read by the user device. In yet other embodiments, the short-range data transfer means could be an acoustic or audible broadcast of the verification data by the first local host that is heard by a user of the user device and/or recognized by the user device. In yet other embodiments, the short-range data transfer means could be visual display of the verification data by the first local host in a human readable form that is seen directly by the user of the user device and/or by the user device.

Next, step 38 comprises receiving the verification data by the verifier from the user device. The verifier and the user device can be communicatively connected via an electronic or quantum data network, wherein the verification data is transmitted over the data network.

Next, step 40 comprises verifying by the verifier whether the verification data have been produced by the secret at a time that corresponds to a current time for the verifier or a time that is within a time window for the verifier that is acceptable for verification. Successful verification confirms that the user sending the data is likely, or presumptively, near an SE (local host) in the set of SEs (local hosts). The verifier may store secrets and/or keys required for verification of the received data. The verifier can also track current time by an internal clock of the verifier and/or by synchronizing with a cloud time-service available online. In case of asymmetric cryptography, a local device can, in various embodiments, supply a public key in the verification data. Public keys and/or a map of locations per key can be stored in a central registry, such as a public key infrastructure (PKI). That is, in some embodiments, the verifier 16 does not store any keys, but verifies the verification data by executing a verification routine on the data received. The verifier can query a PKI to ensure the public key is registered and/or to obtain a location thereof. In contrast, when symmetric cryptography is employed, the verifier stores the secret(s) used by the SE(s).

With asymmetric cryptography, the verification data preferably includes a time stamp for the local host's current time used for the cyphertext. Thus, verification succeeds when the time of the time stamp in the verification data is within the verifier's allowed time window, such as threshold number of time units (each of a second for example—see FIG. 4) backward and forward relative to the current time unit of the verifier. For example, if the time stamp received by the verifier from the verification data is within the threshold time of the verifier's clock (e.g., 20 or 40 seconds into the future and 40 seconds into the past), then the verification succeeds. In one embodiment, the verifier would "verify" with "corresponding public key". The key can correspond to the secret (key) that the SE uses to "sign" the input.

With symmetric cryptography, the verification data preferably excludes time information because the verifier can independently produce verification data from arbitrary input. In particular, the verifier can produce verification data from the current time (unit) in concordance with the verifier's clock signal. Such data will be compared with the data produced by a local host based on the current time (unit) by the local host's clock. As those two clocks can be out of sync, and the data spend some time in transit, the verifier also derives verification data for a number of consecutive time units by the clock of the verifier. That is, verifier's current time window, wherein verification succeeds, is composed of consecutive time units of arbitrary resolution in proximity of the verifier's clock signal, and a local host uses its own current time unit to produce SE input. In one embodiment, the verifier performs all the same steps that a local host does and compares the received verification data with what is calculated by the verifier. For example, the verifier might make multiple comparisons: 1) received verification data with that calculated for the current time unit of the verifier; 2) for the preceding time unit(s); 3) for the following time unit(s). If any of those comparisons is a match, the verification is successful. This operation accounts for non-ideally synchronized clocks between the verifier and the local device, and for latency in the user's manual actions in transmitting the verification data to the verifier, and/or latencies in the data network. In other words, the verifier would just use an expanded notion of "a current time." That way, if the local device regenerates verification data every 30 seconds, any such verification data can be usable by a user for a multiple of those 30 seconds.

In other embodiments, the local device can supply a current time as part of verification data. This allows the verifier to decide whether to accept the current time within the data received or, in other words, the verifier can choose an arbitrary current time window.

Thus, assembling "the input" based on "a current time" by the local host, producing cyphertext by SE, assembling verification data based on the cyphertext by the local host, transmitting-receiving the data, and verification-all happening within that implicit current time (window) of a verifier, can be required for successful verification. The verifier verifies that the data have been produced by the secret (key) at the current time. Current time of a verifier can have broader span than that of the local host, e.g., the verifier can compare a short code received with three (or more) short codes computed for, as in the example described above, the current, preceding, and following time unit. This is to account for inaccurate clocks of the verifier and/or the local host and to tolerate a slow manual transfer of the code and/or network relay.

In one example of a local host, a Raspberry Pi microcomputer can be used as local host. It has a microSD card as a non-volatile memory where all configurations and software are stored (analogous to a hard or solid-state drive in a computer). It further has Broadcom CPU, such as BCM2711, Quad core Cortex-A72 (ARM v8) 64-bit SoC, and I2C bus for attaching peripherals. There are two peripherals attached: 1) secure element NXP EdgeLock SE050E, and 2) Real Time Clock (RTC) DS3231SN. Software-wise, a Linux-based operating system can be used. It is configured to synchronize with GPS clock by NTP service when Internet-connected and with on-board RTC when it is not. The RTC also has a Lithium battery (CR1632)—similarly to a regular motherboard of a personal computer. The battery allows the RTC to keep time without external source of energy for up to 10 years. NXP proprietary middleware, specific interface drivers, and other proprietary software is used to facilitate the logic set out herein.

Figure 3:
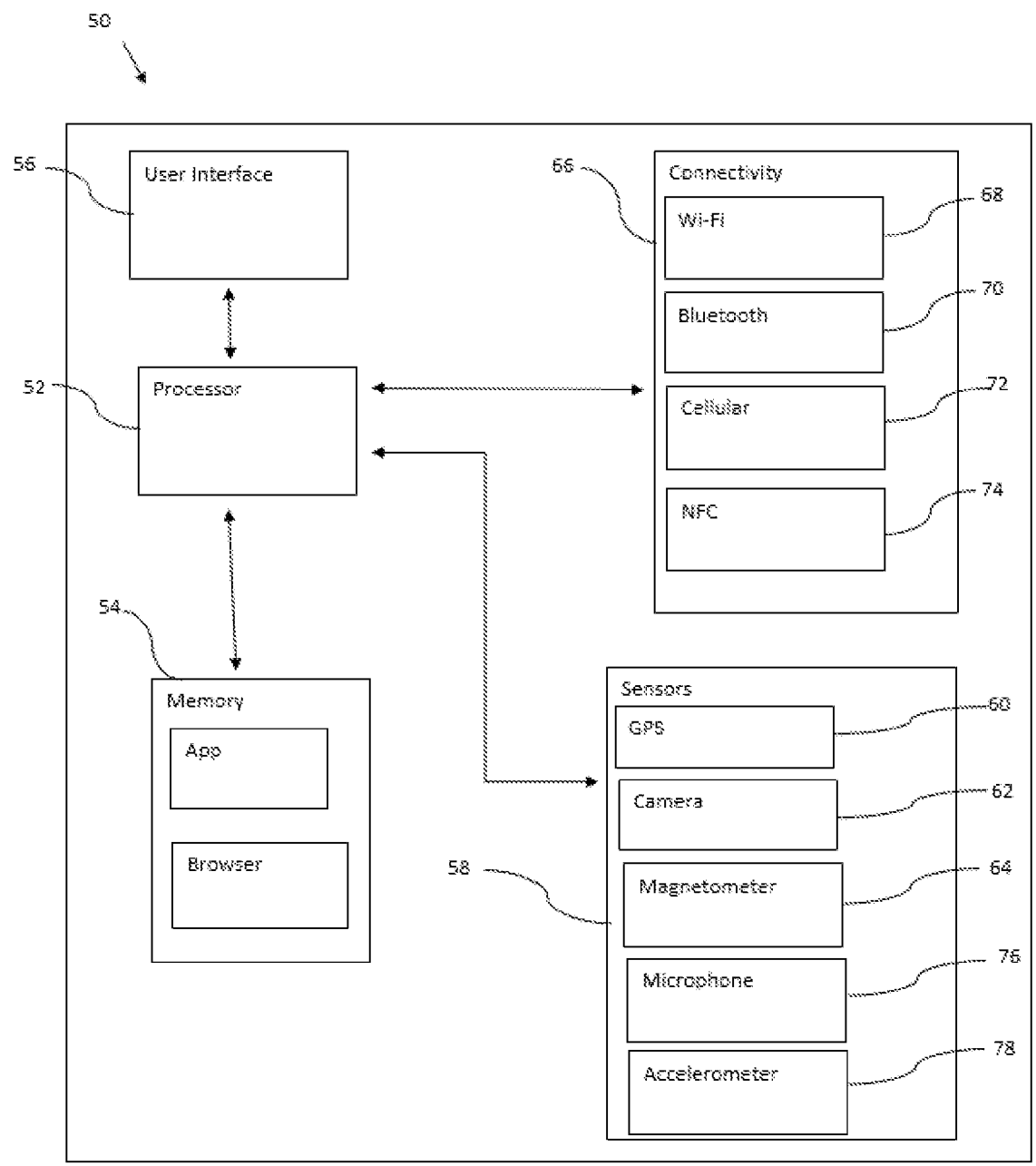
FIG. 3 is a diagram of an embodiment of a user device, according to various embodiments of the present disclosure.

An example of the user device according to one embodiment is shown in FIG. 3. FIG. 3 is a block diagram of a mobile device according to various embodiments. The mobile device may be a smartphone, a tablet computer, a wearable computer (such as smart glasses), or any other suitable mobile computing device. FIG. 3 illustrates some of the components that in at least one example may be employed by or included as part of the mobile device 50. The mobile device 50 includes, for example, at least one processor 52, at least one memory unit 54, and a user interface 56. The memory 54 may include internal Random Access Memory (RAM), Read Only Memory (ROM) and/or flash memory, as well as optional removable storage. The RAM may be, for example, LPDDR2 DRAM; the ROM may include one or more memory chips; the flash memory may include an SSD or eMMC flash memory; and the optional removable storage may include a form of microSD card. The mobile device has an application that communicates with the local host 11 and the verifier 16. The user interface 56 may include a display (such as a LCD, LED, OLED display), a touch interface, and/or haptic systems that are common in today's mobile devices for allowing users to view and input information via the mobile device's display.

The mobile device 50 may also include various sensors 58 that are in communication with the processor 52, including a GPS receiver (or chip) 60 for calculating (in an assisted GPS process, for example) and/or receiving GPS position coordinates for the mobile device 50. The mobile device 50 may also include a camera system 62 that captures digital images and/or video. The cameras of the camera system 62 may comprise, for example, CCD or CMOS sensors. The mobile device 50 may also include a magnetometer 64 and/or other inertial sensors, such as accelerometers and gyroscopes to help determine an orientation or bearing of the mobile device 50. Additionally, the sensors can include a microphone 76 and an accelerometer 78.

As shown in FIG. 3, the illustrated mobile device 50 also includes a wireless connectivity module 66, which may include any or all of a Wi-Fi (IEEE 802.11) module 68, a Bluetooth module 70, a cellular network interface (e.g., 4G LTE or 5G) 72, a near field communication module 74, and/or any other suitable wireless interface. For the sake of simplicity, other conventional components of the mobile device 50 are not shown in FIG. 3, such as the power management system, the battery, level translators, the audio system, codecs, USB ports, etc. These modules may be used to communicate to the local host 11 and the verifier 16.

NFC dynamic, aka connected, aka dual-interface tags can be continuously re-programmed to contain up-to-date verification data readable by the user devices. A local host can comprise such a tag being connected to its I2C bus for example. Alternatively, the local host can be in communication with plurality of dedicated microcontrollers, each bearing the tag.

In one general aspect, therefore, the present invention is a method that comprises the step of producing, by a first secure element ("SE"), a cyphertext, where the first SE is a component of a first local host. The cyphertext is produced by: supplying an input to the first SE, where the input is based on a current time; and producing the cyphertext based on a secret stored by the first SE and based on the input. The method also comprises transferring, by a short-range data transfer means, verification data from the local host to a user device, where the verification data are based on the cyphertext. The method also comprises receiving, by a verifier, from the user device, the verification data. The method also comprises verifying, by the verifier, that the verification data have been produced by the secret, so that the user device is presumptively within a range of the short-range data transfer means of the local host at the current time.

An example of arbitrary time resolution and interpretations of current time according to one embodiment is shown in FIG. 4. FIG. 4 is a block diagram of an arbitrary time resolution and interpretations of current time according to various embodiments. The block diagram 80 has a time scale 82 with three distinct time units, the current time unit 86, the previous time unit 88, and next time unit 84 (future time unit). The current time unit 86 represents the time unit that falls within the current time. The local host 90 determines the verification data for each time unit. As shown, each time unit has a corresponding verification data. The local host determines the first verification data 96 which corresponds to the previous time unit 88, the second verification data 94 which corresponds to the current time unit 86, and the third verification data 92 which corresponds to the next time unit 84. When the verifier verifies the verification data, the current time window 102 used by the verifier encompasses at least the current time unit. In one aspect, as shown, the current time window encompasses three time units, the previous time unit 88, the current time unit 86, and the next time unit 84. By having a larger time window at the verification stage than when generating the verification data, the system can accommodate delays at various stages of data propagation and variations in measured time. The current time window can encompass more than the three time units shown.

For example, if the local clock is running fast 98 than the verification step can still succeed because the current time window encompasses at least the next time unit 84. For example, if the data changes while the user is typing, the data typed in becomes the first verification data 96. The first verification data is still within the current time window 102 of the verifier.

In another general aspect, the present invention is directed to a system that comprises: a local host, where the local host comprises a secure element ("SE"); a verifier; and a user device. The SE is configured to produce a cyphertext based on a secret stored by the SE and based on an input to the SE that is based on a current time. The user device is configured to receive, by a short-range data transfer means, from the local host, verification data, where the verification data are based on the cyphertext. The user device is configured to transmit, to the verifier, the verification data. And the verifier is configured to verify that the verification data have been produced by the secret, so that the user device is likely within the data transfer range of the local host at the current time.

The aforementioned method and system can also be extended to a network, or collection, of local hosts, each with an SE. In such an aspect, the method comprises producing, by a first secure element ("SE"), a cyphertext, where the first SE is a component of a first local host, where the first local host is one of a plurality of local hosts positioned across a habitable area, and where each of the plurality of local hosts comprises an SE. Producing the cyphertext comprises: supplying an input to the first SE, wherein the input is based on a current time; and producing the cyphertext based on the input and based on a common secret stored by the SE of each of the plurality of local hosts. The method also comprises transferring, by a short-range data transfer means, verification data from the first local host to a user device, where the verification data are based on the cyphertext. The method also comprises receiving, by a verifier, from the user device, the verification data. The method also comprises verifying, by the verifier, that the verification data have been produced by the common secret, so that the user device is presumptively within a data transfer range of one of the plurality of local hosts at the current time.

The corresponding system can comprise: a plurality of local hosts, where the each local host comprises a secure element ("SE"), such that the plurality of local hosts comprises a first local host that comprises a first SE; a verifier; and a user device. The first SE is configured to produce a cyphertext based on a common secret stored by each of SEs and based on an input to the first SE that is based on a current time. The user device is configured to receive, by a short-range data transfer means, from the first local host, verification data, where the verification data are based on the cyphertext. The user device is configured to transmit, to the verifier, the verification data. And the verifier is configured to verify that the verification data have been produced by the common secret, so that the user device is presumptively within a data transfer range of one of the plurality of local hosts.

In various implementations, each SE comprises a system on chip (SoC) capable of producing cyphertext based on a secret, where the secret is irrecoverable outside the SoC by design. In one embodiment, each SE can store multiple secrets.

In various implementations, the short-range data transfer means comprises a short-range data transfer means selected from the group consisting of: an electromagnetic communication link between the local host and the user device; a display of the verification data by the local host that is read by a user and/or the user device directly; and an acoustic broadcast of the verification data by the local host that is perceived by a user and/or the user device directly; quantum communication link between the local host and the user device.

In various implementations, the input is additionally based on additional information, such as a geo-location of the local host and an arbitrary identifier for the first local host.

In various implementations, the local host comprises a clock, and where the current time is obtained from the clock.

In various implementations, the verifier stores the secret.

In various implementations, the verifier verifies by, and the step of verifying comprises: computing, by the verifier, a plurality of cyphertexts, where each of the cyphertexts is based on a clock signal of the verifier; generating, by the verifier, a code from each of the plurality of cyphertexts; and comparing, by the verifier, the codes to the verification data from the user device.

In various implementations, the secret comprises a secret key and the verifier stores a corresponding public key for the secret key.

In various implementations, the verification data comprises a time stamp and/or a public key for the secret.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

What is claimed is:

1. A method for verifying a location of a user in a habitable area, wherein there are one or more secure elements ("SEs") in the habitable area, and wherein a location of each of the one or more SEs is known by a verifier, the method comprising:
producing, by a first SE, a cyphertext, wherein the first SE is a component of a local host positioned at a first known location in the habitable area, wherein producing the cyphertext comprises:
supplying an input to the first SE, wherein the input is based on a current time; and
producing the cyphertext based on a secret stored by the first SE and based on the input;
transferring, by a short-range data transfer means, verification data from the local host to a user device of the user, wherein the verification data are based on the cyphertext;
receiving, by the verifier, from the user device, the verification data; and
verifying, by the verifier, that the user of the user device is presumptively at the first known location in the habitable area at the current time by determining that the verification data have been produced by the secret.

2. The method of claim 1, wherein the SE comprises a system on chip (SoC) capable of producing the cyphertext based on the secret, wherein the secret is irrecoverable outside the SoC by design.

3. The method of claim 1, wherein the short-range data transfer means comprises a short-range data transfer means selected from the group consisting of:
an electromagnetic communication link between the local host and the user device;
a display of the verification data by the local host that is read by the user and/or the user device directly;
an acoustic broadcast of the verification data by the local host that is perceived by the user and/or the user device directly; and
a quantum communication link between the local host and the user device.

4. The method of claim 1, wherein the input is additionally based on additional information, wherein the additional information comprises information selected from a group of a geo-location of the local host and an arbitrary identifier for the local host.

5. The method of claim 1, wherein the local host comprises a clock, and where the current time is obtained from the clock.

6. The method of claim 1, wherein the verifier stores the secret.

7. The method of claim 1, wherein:
the secret comprises a secret key; and
the verifier stores a corresponding public key for the secret key.

8. The method of claim 1, wherein the verification succeeds upon a determination by the verifier that the verification data are based on time that is within a verification time window chosen by the verifier.

9. The method of claim 1, wherein the verification data comprises data selected from the group consisting of a time stamp and a public key for the secret.

10. A method for verifying a location of a user in a habitable area, wherein there are a plurality of secure elements (SEs) in the habitable area, and wherein a location of each of the plurality of SEs are known by a verifier, the method comprising:
producing, by a first SE, a cyphertext, wherein the first SE is a component of a first local host, wherein the first local host is one of a plurality of local hosts positioned across the habitable area, wherein each of the plurality of local hosts comprises an SE, and wherein producing the cyphertext comprises:
supplying an input to the first SE, wherein the input is based on a current time; and
producing the cyphertext based on the input and based on a common secret stored by the SE of each of the plurality of local hosts;
transferring, by a short-range data transfer means, verification data from the first local host to a user device of the user, wherein the verification data are based on the cyphertext;
receiving, by the verifier, from the user device, the verification data; and
verifying, by the verifier, that the user of the user device is presumptively at a known location of one of the plurality of SEs in the habitable area at the current time by determining that the verification data have been produced by the secret.

11. The method of claim 10, wherein the verifier stores the secret.

12. The method of claim 11, wherein verifying comprises:
computing, by the verifier, a plurality of cyphertexts, wherein each of the cyphertexts is based on a clock signal of the verifier;
generating, by the verifier, a code from each of the plurality of cyphertexts; and
comparing, by the verifier, the codes to the verification data from the user device.

13. The method of claim 10, wherein:
the secret comprises a secret key; and
the verifier stores a corresponding public key for the secret key.

14. The method of claim 10, wherein the verification data comprises data selected from the group consisting of a time stamp and a public key for the secret.

15. A system comprising:
a verifier;
a local host, wherein the local host comprises a secure element ("SE"), wherein the local host is positioned in a habitable area, wherein a location of the SE is known by the verifier; and
a user device,
wherein:
the SE is configured to produce a cyphertext based on a secret stored by the SE and based on an input to the SE that is based on a current time;
the user device is configured to receive, by a short-range data transfer means, from the local host, verification data, wherein the verification data are based on the cyphertext;
the user device is configured to transmit, to the verifier, the verification data; and
the verifier is configured to verify that a user of the user device is presumptively at a known location of the SE at the current time by determining that the verification data have been produced by the secret.

16. The system of claim 15, wherein the local host comprises a computer system that is configured, through software, to construct the input, to construct the verification data, and to transfer the verification data.

17. The system of claim 15, wherein:
the verifier comprises a computer system that is in communication with the user device via a data network; and
a software application of the user device, when executed by the user device, is further for transmitting the verification data to the verifier via the data network.

18. The system of claim 15, wherein the verifier stores the secret.

19. The system of claim 15, wherein:
the secret comprises a secret key; and
the verifier stores a corresponding public key for the secret key.

20. The system of claim 15, wherein the verification succeeds upon a determination by the verifier that the verification data are based on time that is within a verification time window chosen by the verifier.

21. The system of claim 15, wherein the verification data comprises data selected from the group consisting of a time stamp and a public key for the secret.

22. A system comprising:
a verifier;
a plurality of local hosts positioned across a habitable area, wherein each local host comprises a secure element ("SE"), such that the plurality of local hosts comprises a first local host that comprises a first SE, wherein a location of each SE of each of the plurality of local hosts are known by the verifier, such that a first location of the first SE is known by the verifier; and
a user device,
wherein:
the first SE is configured to produce a cyphertext based on a common secret stored by each of SEs and based on an input to the first SE that is based on a current time;
the user device is configured to receive, by a short-range data transfer means, from the first local host, verification data, wherein the verification data are based on the cyphertext;
the user device is configured to transmit, to the verifier, the verification data; and
the verifier is configured to verify that a user of the user device is presumptively at a known location of one of the SEs in the habitable area at the current time by determining that the verification data have been produced by the secret.

23. The system of claim 22, wherein the verifier stores the secret.

24. The system of claim 23, wherein verifying comprises:
computing, by the verifier, a plurality of cyphertexts, wherein each of the cyphertexts is based on a clock signal of the verifier;
generating, by the verifier, a code from each of the plurality of cyphertexts; and
comparing, by the verifier, the codes to the verification data from the user device.

25. The system of claim 22, wherein:
the secret comprises a secret key; and the verifier stores a corresponding public key for the secret key.

26. The system of claim 22, wherein the verification data comprises data selected from the group consisting of a time stamp and a public key for the secret.

27. The system of claim 22, wherein the local host and the user device comprise software that can be configured to indicate to a user remaining time for the user to trigger transmission of the verification data to the verifier.

* * * * *